United States Patent
Sikder et al.

(10) Patent No.: US 12,523,495 B2
(45) Date of Patent: Jan. 13, 2026

(54) SYSTEM AND METHOD FOR DETECTING A FLAT SURFACE CONDITION FOR SENSOR ALIGNMENT AND BIAS CORRECTION

(71) Applicant: GM Global Technology Operations LLC, Detroit, MI (US)

(72) Inventors: Tushita Arun Sikder, Windsor (CA); Mohammadali Shahriari, Markham (CA); Dhaval Kavindra Sompura, Canton, MI (US); Abdoul Karim Abdoul Azizou, Courtice (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 69 days.

(21) Appl. No.: 18/626,746

(22) Filed: Apr. 4, 2024

(65) Prior Publication Data

US 2025/0314503 A1    Oct. 9, 2025

(51) Int. Cl.
*G01C 21/00*    (2006.01)
*G01C 25/00*    (2006.01)

(52) U.S. Cl.
CPC ..... *G01C 21/3822* (2020.08); *G01C 21/3841* (2020.08); *G01C 25/005* (2013.01)

(58) Field of Classification Search
CPC ............ G01C 21/3822; G01C 21/3841; G01C 25/005
See application file for complete search history.

(56) References Cited

U.S. PATENT DOCUMENTS

| 2021/0245746 A1* | 8/2021 | Arai ..................... B60K 17/354 |
| 2021/0373138 A1* | 12/2021 | Jiang ..................... G01S 7/4972 |
| 2023/0021313 A1* | 1/2023 | Cristea ............... G01C 21/3889 |

OTHER PUBLICATIONS

WO 2023/047961 to Kanamori, Keita et al (Year: 2023).*
German Office Action for German Application No. 102024113854.8; dated May 22, 2025; 3 pages.

* cited by examiner

*Primary Examiner* — Hunter B Lonsberry
(74) *Attorney, Agent, or Firm* — CANTOR COLBURN LLP

(57) ABSTRACT

A vehicle includes a system for calibrating a sensor of a vehicle. A first measure of road grade is determined for a road section being traversed by the vehicle based on Global Positioning Satellite (GPS) data. A second measure of road grade is determined for the road section using map data and vehicle dynamics data. An applied longitudinal force on the vehicle is controlled to maintain the vehicle at a constant velocity when the first measure and the second measure indicate that the road section is a flat horizontal surface. A third measure of road grade is determined based on the applied longitudinal force. A parameter of the sensor is adjusted when the third measure indicates that the road section is the flat horizontal surface.

20 Claims, 3 Drawing Sheets

SYSTEM AND METHOD FOR DETECTING A FLAT SURFACE CONDITION FOR SENSOR ALIGNMENT AND BIAS CORRECTION

INTRODUCTION

The subject disclosure relates to alignment and bias correction of sensors in a vehicle and, in particular, to a method for detecting a flat horizontal surface for a road being traversed by the vehicle to enable alignment and bias correction.

A vehicle can employ one or more sensors for detecting its environment in order to facilitate driving and maneuvering. Many of these sensors can be high-precision sensors. For correct operation of the vehicle, a sensor will need to be aligned with the vehicle and calibrated to account for any associated sensor bias. Sensor bias can be corrected while the vehicle is moving along a flat horizontal surface. Accordingly, it is desirable to provide a method for determining when the vehicle is moving along a flat horizontal surface.

SUMMARY

In one exemplary embodiment, a method of calibrating a sensor of a vehicle is disclosed. A first measure of road grade is determined for a road section being traversed by the vehicle based on Global Positioning Satellite (GPS) data. A second measure of road grade is determined for the road section using map data and vehicle dynamics data. An applied longitudinal force on the vehicle is controlled to maintain the vehicle at a constant velocity when the first measure and the second measure indicate that the road section is a flat horizontal surface. A third measure of road grade is determined based on the applied longitudinal force. A parameter of the sensor is adjusted when the third measure indicates that the road section is the flat horizontal surface.

In addition to one or more of the features described herein, wherein the GPS data includes a latitude of the vehicle and a longitude of the vehicle, the method further includes calculating a predicted latitude and a predicted longitude for a predicted location of the vehicle based on a delay in reception of the GPS data.

In addition to one or more of the features described herein, the method further includes calculating the predicted latitude and the predicted longitude using a vehicle speed.

In addition to one or more of the features described herein, the method further includes determining an elevation of the vehicle at the predicted location from the predicted latitude and the predicted longitude and determining the first measure based on a comparison of a change in the elevation to an elevation difference criterion.

In addition to one or more of the features described herein, the method further includes obtaining a slope and a cross-slope of the road section at the predicted location using the predicted latitude and the predicted longitude at a map server, converting the slope and the cross-slope to a grade and bank angle at the predicted location, and determining the second measure at the predicted location based on a comparison of the grade to a grade criterion and bank angle to a bank angle criterion.

In addition to one or more of the features described herein, the method further includes determining the third measure based on a comparison of the applied longitudinal force to a nominal longitudinal force on the vehicle.

In addition to one or more of the features described herein, the method further includes updating a map database when the third measure indicates the flat horizontal surface.

In another exemplary embodiment, a system for calibrating a sensor of vehicle is disclosed. The system includes a processor configured to determine a first measure of road grade for a road section being traversed by the vehicle based on Global Positioning Satellite (GPS) data, determine a second measure of road grade for the road section using map data and vehicle dynamics data, control an applied longitudinal force on the vehicle to maintain the vehicle at a constant velocity when the first measure and the second measure indicate that the road section is a flat horizontal surface, determine a third measure of road grade based on the applied longitudinal force, and adjust a parameter of the sensor when the third measure indicates that the road section is the flat horizontal surface.

In addition to one or more of the features described herein, the GPS data includes a latitude of the vehicle and a longitude of the vehicle and the processor is further configured to calculate a predicted latitude and a predicted longitude for a predicted location of the vehicle based on a delay in reception of the GPS data.

In addition to one or more of the features described herein, the processer is further configured to calculate the predicted latitude and the predicted longitude using a vehicle speed.

In addition to one or more of the features described herein, the processer is further configured to determine an elevation of the vehicle at the predicted location from the predicted latitude and the predicted longitude and determine the first measure based on a comparison of a change in the elevation to an elevation difference criterion.

In addition to one or more of the features described herein, the processer is further configured to obtain a slope and a cross-slope of the road section at the predicted location using the predicted latitude and the predicted longitude at a map server, convert the slope and the cross-slope to a grade and bank angle at the predicted location, and determining the second measure at the predicted location based on a comparison of the grade to a grade criterion and bank angle to a bank angle criterion.

In addition to one or more of the features described herein, the processer is further configured to determine the third measure based on a comparison of the applied longitudinal force to a nominal longitudinal force on the vehicle.

In addition to one or more of the features described herein, the processer is further configured to update a map database when the third measure indicates the flat horizontal surface.

In yet another exemplary embodiment, a vehicle is disclosed. The vehicle includes a sensor and a processor. The sensor is configured to measure a dynamic parameter of the vehicle suitable for use in trajectory control of the vehicle. The processor is configured to determine a first measure of road grade for a road section being traversed by the vehicle based on Global Positioning Satellite (GPS) data, determine a second measure of road grade for the road section using map data and vehicle dynamics data, control an applied longitudinal force on the vehicle to maintain the vehicle at a constant velocity when the first measure and the second measure indicate that the road section is a flat horizontal surface, determine a third measure of road grade based on the applied longitudinal force, and adjust a parameter of the sensor when the third measure indicates that the road section is the flat horizontal surface.

In addition to one or more of the features described herein, the GPS data includes a latitude of the vehicle and a longitude of the vehicle and the processer is further configured to calculate a predicted latitude and a predicted longitude for a predicted location of the vehicle based on a delay in reception of the GPS data.

In addition to one or more of the features described herein, the processer is further configured to determine an elevation of the vehicle at the predicted location and determine the first measure based on a comparison of a change in the elevation to an elevation difference criterion.

In addition to one or more of the features described herein, the processer is further configured to obtain a slope and a cross-slope of the road section at the predicted location using the predicted latitude and the predicted longitude at a map server, convert the slope and the cross-slope to a grade and bank angle at the predicted location, and determining the second measure at the predicted location based on a comparison of the grade to a grade criterion and bank angle to a bank angle criterion.

In addition to one or more of the features described herein, the processer is further configured to determine the third measure based on a comparison of the applied longitudinal force to a nominal longitudinal force on the vehicle.

In addition to one or more of the features described herein, the processer is further configured to update a map database when the third measure indicates the flat horizontal surface.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
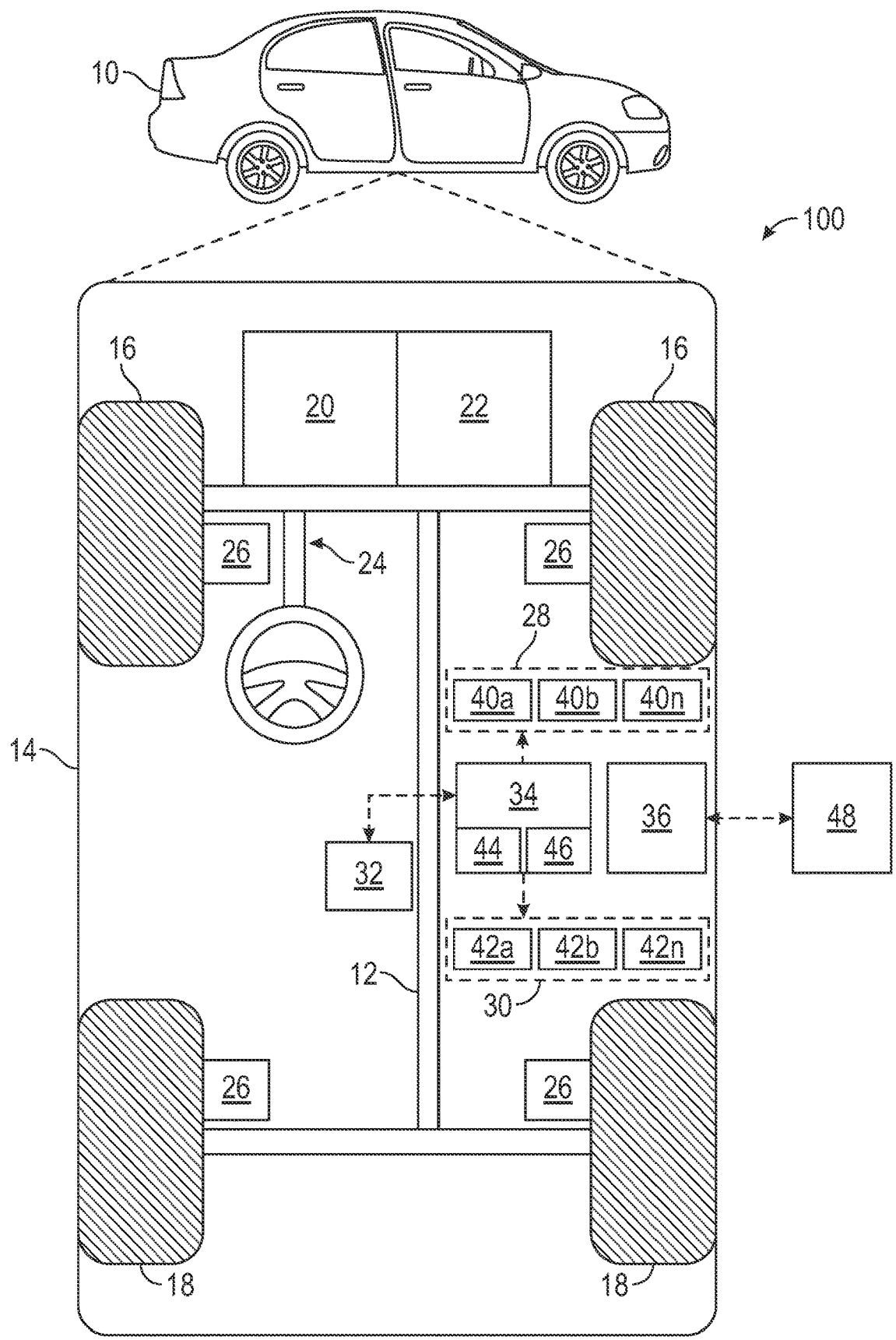
FIG. 1 shows a vehicle with an associated trajectory planning system in an illustrative embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 10 with an associated trajectory planning system 100. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the trajectory planning system 100 is incorporated into the autonomous vehicle. The autonomous vehicle is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the front wheels 16 and rear wheels 18. The brake system 26 may, in various embodiments, include friction brakes, brake by wire, a regenerative braking system such as an electric machine, and/or other appropriate braking systems. The steering system 24 influences a position of the of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors suitable for obtaining data regarding an environment of the vehicle. The sensor system 28 can also include dynamic sensors for measuring one or more dynamic parameters of the vehicle which can be used in automated trajectory control of the vehicle, automated steering, cruise control, etc. Exemplary dynamic sensors include an inertial measurement unit (IMU) that measures accelerations at the vehicle in three dimensions, a steering angle sensor, a torque sensor, a yaw rate sensor, a wheel velocity sensor, etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air conditioning, music, lighting, etc. (not shown).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the trajectory planning system 100 and, when executed by the processor 44, determines whether the vehicle is travelling along a flat horizontal surface and calibrates various sensors when this condition is met.

The communication system 36 is configured to wirelessly communicate information to and from other entities 48, such as but not limited to, other vehicles ("V2V" communication,) infrastructure ("V2I" communication), remote systems, Global Positioning Satellite (GPS), map servers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

On occasion, sensors of the sensor system. 28 require calibration to adjust for sensor bias. This calibration can be performed while the vehicle is moving along a flat horizontal surface.

The method disclosed herein provides three separate tests for determining a flat horizontal road surface. A first test determines a first measure indicative of the road surface using Global Positioning Satellite (GPS) data. A second test determines a second measure indicative of the road surface using map data and dynamic parameters of the vehicle. A third test determines a third measure of the flat horizontal road surface using a longitudinal force applied to the vehicle to maintain a constant velocity. The third test is performed when the first measure and the second measure meet respective criteria. Details of the tests are disclosed herein.

Figure 2:
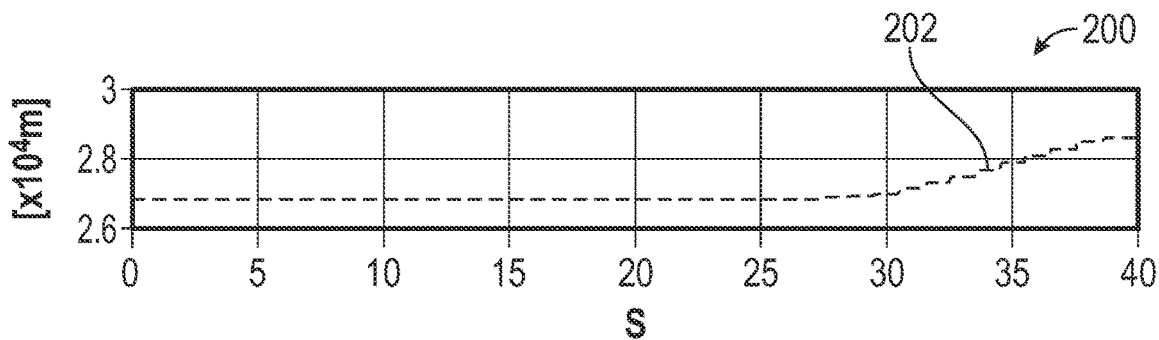
FIG. 2 shows a graph illustrating an elevation of the vehicle based on a longitude and latitude obtained from GPS data.

FIG. 2 shows a graph 200 illustrating an elevation 202 of the vehicle based on a longitude and latitude obtained from GPS data. Time is shown in seconds (s) along the abscissa and elevation is shown in meters ($10 \times m$) along the ordinate axis. GPS data can include a series of position coordinates (i.e., latitude and longitude). Elevation is presented as a distance from earth's center. The longitude and latitude values received from GPS data can be adjusted to create a predicted latitude and predicted longitude that compensates for delays in reception of the GPS data. In an embodiment, the predicted latitude and predicted longitude can be determined from the longitude, latitude and vehicle speed or vehicle velocity. The elevation can be determined using the predicted latitude and predicted longitude and relation between latitude, longitude and earth's radius or elevation. In FIG. 2, the elevation 202 is constant from 0 seconds to about 30 seconds (suggesting a flat horizontal road section) and then increases from about 30 seconds to 40 seconds (suggesting a non-zero road grade).

Figure 3:
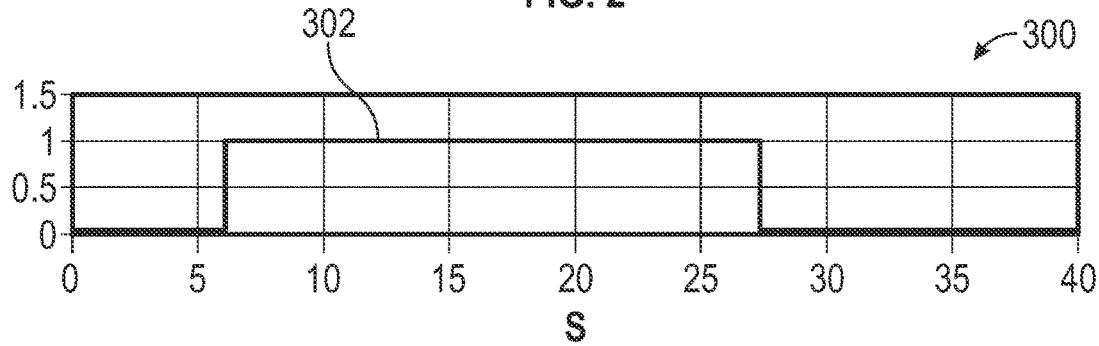
FIG. 3 shows a graph of an indicator that is calculated from the elevation of FIG. 2.

FIG. 3 shows a graph 300 of an indicator 302 that is calculated from the elevation 202 of FIG. 2. Time is shown in seconds (s) along the abscissa and the numerical value of the indicator is shown along the ordinate axis. When the value is 0, the road grade is non-zero and when the value is 1, the road is flat and horizontal. The indicator 302 indicates a probability that the road section is flat based on the elevation values and/or changes in elevation. The indicator 302 indicates that the road section is flat from about 6 seconds to about 27 seconds.

Figure 4:
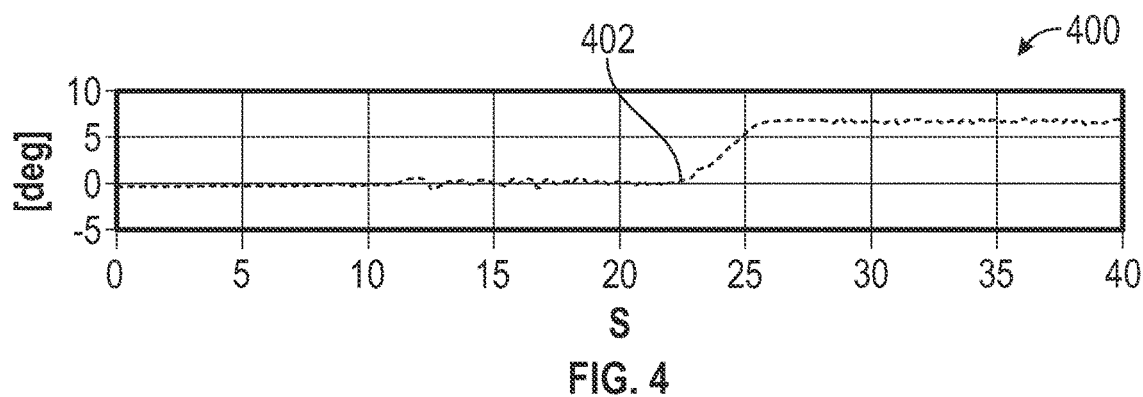
FIG. 4 shows a graph of a ground truth road grade corresponding to the road section traversed in FIG. 2.

FIG. 4 shows a graph 400 of a ground truth road grade 402 corresponding to the road section traversed in FIG. 2. Time is shown in seconds (s) along the abscissa and road grade is shown in degrees (deg) along the ordinate axis. The ground truth road grade 402 is zero from 0 seconds to about 23 seconds, increases from about 23 seconds to about 25 seconds, and is constant at about 7 degrees from about 25 seconds to 40 seconds. While the indicator 302 is sensitive to road grade, from a comparison of FIG. 4 and FIG. 3 (in the time region from about 23 seconds to about 25 seconds), the indicator 302 may be insensitive to a road grade transition. Therefore, the indicator 302 is used an initial test before proceeding to further testing.

The second test for determining a flat horizontal road condition uses map data and dynamic parameter measurements obtained at the vehicle. A difference between a map-based lateral acceleration of the vehicle and an IMU-based lateral acceleration can be used to determine a difference between map-based roll angle and IMU-based roll angle. The difference being equal to zero within a selected criterion suggests a flat horizontal surface and further testing can be performed.

A bank angle of the road is assumed to be at a steady state ($\dot{V}_y=0$). A cross slope of the vehicle can be determined using IMU measurements, as shown in Eq. (1):

$$\hat{\theta} + \hat{\phi} = \sin^{-1}[(\hat{a}_{y_{IMU}} - \hat{\omega}_{z_{IMU}} * V_x)/g] \qquad \text{Eq. (1)}$$

where $\hat{\theta}$ is the cross slope, $\hat{\phi}$ is a roll angle of the vehicle, $a_{y_{IMU}}$ is a lateral acceleration of the vehicle as detected by the IMU, $\omega_{y_{IMU}}$ is a yaw angle of the vehicle as detected by the IMU, $V_x$ is a longitudinal speed of the vehicle detected using velocity sensors of the vehicle and g is the acceleration of gravity. Assuming that the roll angle is small (i.e., $\hat{\phi}=0$), then:

$$\hat{\theta} = \sin^{-1}[(a_{y_{IMU}} - \omega_{z_{IMU}} * V_x)/g] \qquad \text{Eq. (2)}$$

The yaw rate can be determined from Eq. (3):

$$\hat{\omega}_{z_{IMU}} = (a_{y_{IMU}} - g\sin\theta)/V_x \qquad \text{Eq. (3)}$$

The yaw rate measurement of Eq. (3) can be calculated assuming the roll angle is small and the vehicle is in a steady state (i.e., $\dot{V}_y=0$).

Additionally, Eq. (2) can be solved for the IMU-based lateral acceleration:

$$\hat{a}_{y_{IMU}} = g\sin\hat{\theta} + \omega_{z_{IMU}} * V_x \qquad \text{Eq. (4)}$$

A map-based lateral acceleration $\hat{a}_{y_{Map\_based}}$ can be written in terms of the cross slope obtained from map data and using the yaw rate obtained from the IMU, as shown in Eq. (5):

$$\hat{a}_{y_{Map\_based}} = g\sin\theta_{Map} + \omega_{z_{IMU}} * V_x \qquad \text{Eq. (5)}$$

A difference between the IMU-based lateral acceleration the map-based lateral acceleration can then be derived from Eq. (4) and Eq. (5), as shown in Eq. (6):

$$\hat{a}_{y_{IMU}} - \hat{a}_{y_{Map}} = g(\sin\hat{\theta} - \sin\theta) \qquad \text{Eq. (6)}$$

Assuming the bank angle is small, then $\Delta \sin\theta = \sin\hat{\theta} - \sin\theta$ can be simplified as $\Delta\theta = \hat{\theta} - \theta$. Thus, Eq. (6) can be rewritten as $$\Delta a_y = g\Delta\theta \qquad \text{Eq. (7)}$$

When the difference between the IMU-based lateral acceleration and the map-based acceleration is equal to zero (within a given criterion), then the difference between map-based cross slope and IMU-based cross slope is zero (within a given criterion) and the test indicates a zero cross slope. When the zero cross slope is indicated, further testing can be performed.

Figure 5:
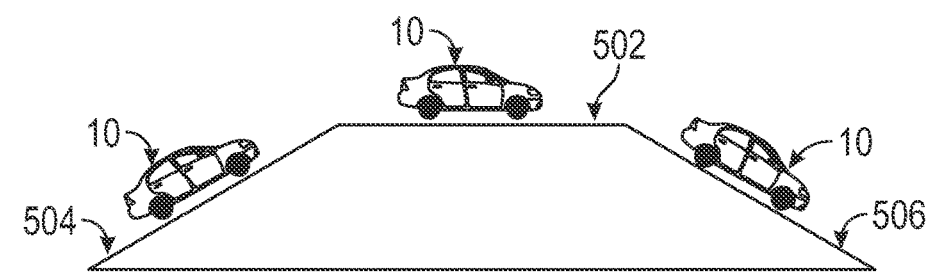
FIG. 5 is a diagram illustrating how road grade affects a relation between applied longitudinal force and nominal longitudinal force.

FIG. 5 is a diagram 500 illustrating how road grade affects a relation between applied longitudinal force and nominal longitudinal force. The vehicle 10 is shown in three scenarios: on a flat horizontal surface 502, on a positive grade surface 504 and on a negative grade surface 506.

A longitudinal acceleration ($a_x$) of the vehicle 10 is proportional to the sum of the external forces on the vehicle, as known by Newton's Second Law of Motion. For the vehicle, this law is stated as shown in Eq. (8)

$$F_{x\_Torque} + F_{x\_RR} + F_{x\_Drag} = ma_x \qquad \text{Eq. (8)}$$

where m is the mass of the vehicle, $F_{x\_Torque}$ is an applied longitudinal force of the vehicle (e.g., longitudinal force resulting from a torque supplied by the motor of the vehicle), $F_{x\_RR}$ is the rolling resistance force of the vehicle (e.g., resistance due to tire friction, etc.), and $F_{x\_Drag}$ is the longitudinal drag force on the vehicle. The drag force can be calculated using Eq. (9):

$$F_{x\_Drag} = \frac{1}{2}\rho v^2 C_d A \qquad \text{Eq. (9)}$$

where $\rho$ is the density of fluid (i.e., air), $C_d$ is a drag coefficient, and A is a cross-sectional area of the vehicle. A nominal value of the drag force can be found by performing tests during driving. The rolling resistance force $F_{x\_RR}$ is related to normal force on the tires as shown in Eq. (3):

$$F_{x\_RR} = F_z \Delta x \qquad \text{Eq. (10)}$$

where $F_z$ is the normal load on the tire and $\Delta x$ is a longitudinal distance from a center of a contact patch of the tire at which the equivalent normal load acts.

When the vehicle is moving at a constant velocity over a flat surface, the sum of the forces in Eq. (1) is equal to zero, as shown in Eq. (11):

$$F_{x\_Torque} + F_{x\_RR} + F_{x\_Drag} = 0. \qquad \text{Eq. (11)}$$

A nominal longitudinal force of the vehicle is provided by the rolling resistance force and the drag force, as shown in Eq. (12):

$$F_{x\_RR} + F_{x\_Drag} = \text{Norminal Longitudinal Force} \qquad \text{Eq. (12)}$$

Referring to FIG. 5, to keep the vehicle moving along the flat horizontal surface 502 at a constant velocity, the applied longitudinal force is equal to the nominal longitudinal force. To maintain constant velocity when the vehicle is moving along a positive grade surface 504 that is flat, the applied longitudinal force is greater than the nominal longitudinal force due to the need to overcome a component of the weight of the vehicle (i.e., mg sin θ). To maintain constant velocity when the vehicle is moving along a flat surface with a negative grade, the applied longitudinal force is less than the nominal longitudinal force due to compensation by the component of the weight of the vehicle (i.e., −mg sin θ). Thus, a comparison of the applied longitudinal force on the vehicle to the nominal longitudinal force can be used to indicate whether the road section being traversed by the vehicle is flat and horizontal (i.e., road grade=0).

Figure 6:
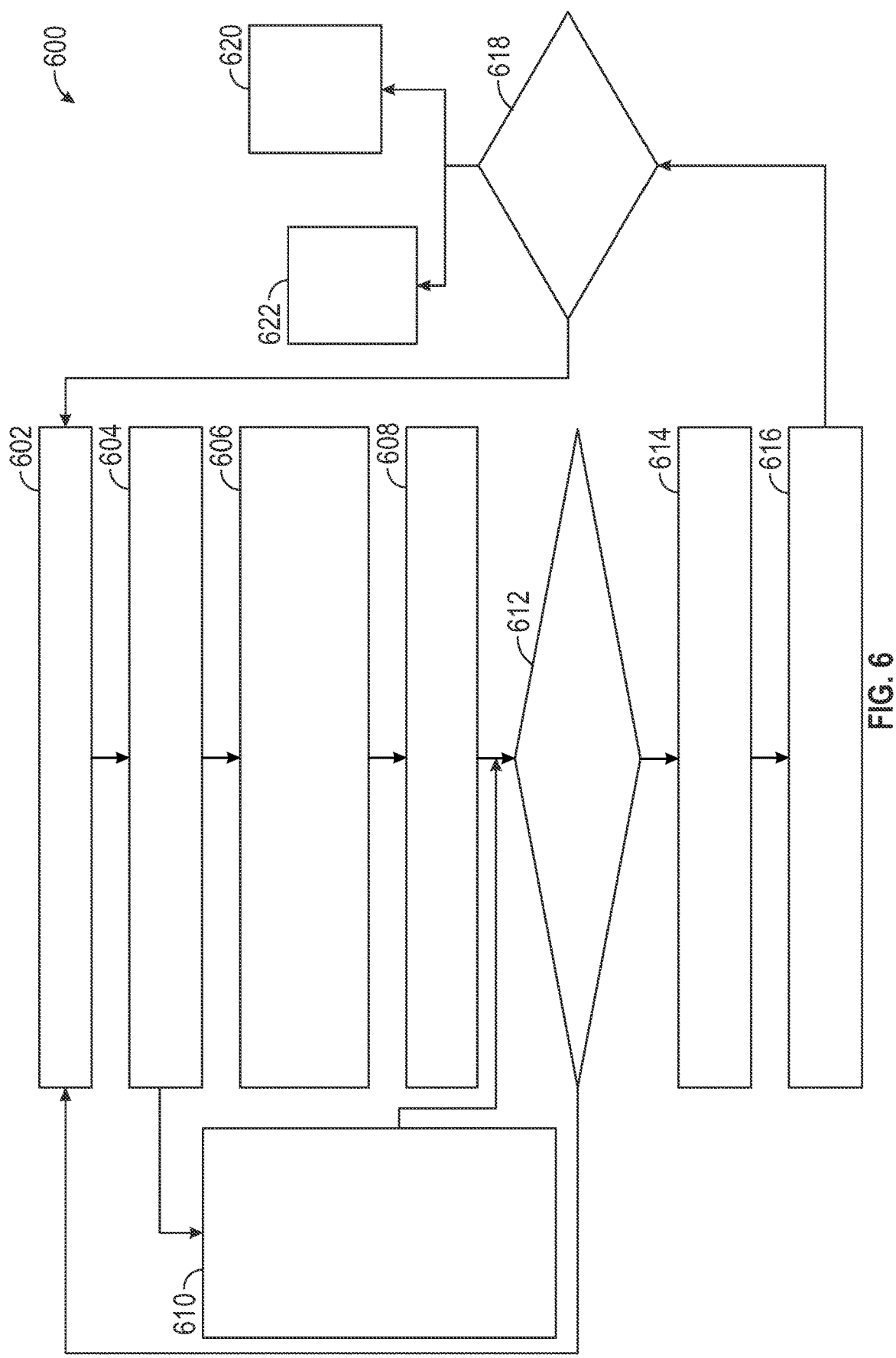
FIG. 6 is a flowchart of a method for determining a horizontal flat surface condition using a fusion of the GPS road test, the map-based road test and the applied longitudinal force road test.

FIG. 6 is a flowchart 600 of a method for determining a horizontal flat surface condition using a fusion of the GPS road test, the map-based road test and the applied longitudinal force road test. In box 602, the GPS data (i.e., latitude, longitude) is obtained. In box 604, a predicted longitudinal and predicted latitude for the vehicle is estimated using the GPS data to compensate for delays in the GPS signal. The predicted latitude and a predicted longitude identify a predicted location of the vehicle a few time steps ahead of the GPS data.

The predicted latitude and longitude are employed in box 606 and box 608. In box 606, the predicted latitude and longitude are used to extract a slope and cross-slope of the road section at the predicted location from the map server. The slope and cross-slope at the predicted location are converted to a road grade and bank angle of the road section at the predicted location. In box 608, the predicted latitude, predicted longitude, and elevation are used to perform the first test of road flatness. The first test produces a first measure based on vehicle elevation by comparing a change in elevation at the predicted location to an elevation difference criterion. When the change in elevation is less than the elevation difference criterion, the first measure indicates a flat surface. In box 610, the road grade and bank angle are used to perform the second test of road flatness. The second test produces a second measure based on a comparison of road grade and bank angle to respective criteria. In an embodiment, the road grade can be compared to a road grade criterion and the bank angle can be compared to a bank angle criterion. When a difference between the road grade and a flat surface road grade and a difference between the bank angle and a flat surface bank angle are within their respective criteria, the second measure indicates a flat surface. In box 612, the first measure and the second measure are evaluated to determine whether both indicate a flat road surface. If either one of the tests does not indicate a flat road surface, the method returns to box 602. Otherwise, the method proceeds to box 614.

In box 614, the vehicle 10 (e.g., the trajectory planning system 100 or the controller 34) applies a longitudinal force on the vehicle to maintain a constant speed at the vehicle. In box 616, the longitudinal force is used to determine a third measure of road flatness.

In box 618, the third measure is evaluated. If the third measure indicates that the road is flat and horizontal, the method proceeds to boxes 620 and 622. In box 620, one or more sensors are evaluated. The bias of a sensor is learned and adjusted to calibrate the sensor. In box 622, the data can be sent to the map server to update map data at the map server. Returning to box 618, if the third measure does not indicate that the road is flat and horizontal, the method returns to box 602.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of calibrating a sensor of a vehicle, comprising:
receiving Global Positioning Satellite (GPS) data at the vehicle indicative of a road grade for a road section being traversed by the vehicle, wherein the GPS data includes a latitude of the vehicle and a longitude of the vehicle;
calculating a predicted latitude and a predicted longitude for a predicted location of the vehicle based on a delay in reception of the GPS data;
determining an elevation of the vehicle at the predicted location from the predicted latitude and the predicted longitude;
determining a first measure of road grade for the road section based on a comparison of a change in the elevation to an elevation difference criterion;
determining a second measure of road grade for the road section using map data and vehicle dynamics data;
controlling an applied longitudinal force on the vehicle to maintain the vehicle at a constant velocity when the first measure and the second measure indicate that the road section is a flat horizontal surface;
determining a third measure of road grade based on the applied longitudinal force; and
adjusting a parameter of the sensor when the third measure indicates that the road section is the flat horizontal surface.

2. The method of claim 1, further comprising calculating the predicted latitude and the predicted longitude using a vehicle speed.

3. The method of claim 1, further comprising obtaining a slope and a cross-slope of the road section at the predicted location using the predicted latitude and the predicted longitude at a map server, converting the slope and the cross-slope to a grade and bank angle at the predicted location, and determining the second measure at the predicted location based on a comparison of the grade to a grade criterion and bank angle to a bank angle criterion.

4. The method of claim 1, further comprising determining the third measure based on a comparison of the applied longitudinal force to a nominal longitudinal force on the vehicle.

5. The method of claim 1, further comprising updating a map database when the third measure indicates the flat horizontal surface.

6. The method of claim 4, wherein the nominal longitudinal force is based on a rolling resistance force of the vehicle and a drag force on the vehicle.

7. The method of claim 1, wherein determining the second measure further comprising determining a difference between map-based roll angle and an inertial measurement unit-based roll angle.

8. A system for calibrating a sensor of vehicle, comprising:
    a processor configured to:
        receive Global Positioning Satellite (GPS) data at the vehicle indicative of a road grade for a road section being traversed by the vehicle, wherein the GPS data includes a latitude of the vehicle and a longitude of the vehicle;
        calculate a predicted latitude and a predicted longitude for a predicted location of the vehicle based on a delay in reception of the GPS data;
        determine an elevation of the vehicle at the predicted location from the predicted latitude and the predicted longitude;
        determine a first measure of road grade for the road section based on a comparison of a change in the elevation to an elevation difference criterion;
        determine a second measure of road grade for the road section using map data and vehicle dynamics data;
        control an applied longitudinal force on the vehicle to maintain the vehicle at a constant velocity when the first measure and the second measure indicate that the road section is a flat horizontal surface;
        determine a third measure of road grade based on the applied longitudinal force; and
        adjust a parameter of the sensor when the third measure indicates that the road section is the flat horizontal surface.

9. The system of claim 8, wherein the processor is further configured to calculate the predicted latitude and the predicted longitude using a vehicle speed.

10. The system of claim 8, wherein the processer is further configured to obtain a slope and a cross-slope of the road section at the predicted location using the predicted latitude and the predicted longitude at a map server, convert the slope and the cross-slope to a grade and bank angle at the predicted location, and determining the second measure at the predicted location based on a comparison of the grade to a grade criterion and bank angle to a bank angle criterion.

11. The system of claim 8, wherein the processer is further configured to determine the third measure based on a comparison of the applied longitudinal force to a nominal longitudinal force on the vehicle.

12. The system of claim 8, wherein the processer is further configured to update a map database when the third measure indicates the flat horizontal surface.

13. The system of claim 8, wherein the processor is further configured to determine the second measure by determining a difference between map-based roll angle and an inertial measurement unit-based roll angle.

14. A vehicle, comprising:
    a sensor configured to measure a dynamic parameter of the vehicle suitable for use in trajectory control of the vehicle;
    a processor configured to:
        receive Global Positioning Satellite (GPS) data at the vehicle indicative of a road grade for a road section being traversed by the vehicle, wherein the GPS data includes a latitude of the vehicle and a longitude of the vehicle;
        calculate a predicted latitude and a predicted longitude for a predicted location of the vehicle based on a delay in reception of the GPS data;
        determine an elevation of the vehicle at the predicted location from the predicted latitude and the predicted longitude;
        determine a first measure of road grade for the road section based on a comparison of a change in the elevation to an elevation difference criterion;
        determine a second measure of road grade for the road section using map data and vehicle dynamics data;
        control an applied longitudinal force on the vehicle to maintain the vehicle at a constant velocity when the first measure and the second measure indicate that the road section is a flat horizontal surface;
        determine a third measure of road grade based on the applied longitudinal force; and
        adjust a parameter of the sensor when the third measure indicates that the road section is the flat horizontal surface.

15. The vehicle of claim 14, wherein the processer is further configured to obtain a slope and a cross-slope of the road section at the predicted location using the predicted latitude and the predicted longitude at a map server, convert the slope and the cross-slope to a grade and bank angle at the predicted location, and determining the second measure at the predicted location based on a comparison of the grade to a grade criterion and bank angle to a bank angle criterion.

16. The vehicle of claim 14, wherein the processer is further configured to determine the third measure based on a comparison of the applied longitudinal force to a nominal longitudinal force on the vehicle.

17. The vehicle of claim 14, wherein the processer is further configured to update a map database when the third measure indicates the flat horizontal surface.

18. The system of claim 11, wherein the nominal longitudinal force is based on a rolling resistance force of the vehicle and a drag force on the vehicle.

19. The vehicle of claim 16, wherein the nominal longitudinal force is based on a rolling resistance force of the vehicle and a drag force on the vehicle.

20. The vehicle of claim 14, wherein the processor is further configured to determine the second measure by determining a difference between map-based roll angle and an inertial measurement unit-based roll angle.

* * * * *